Aug. 6, 1940.　　　　A. REIDINGER　　　　2,210,328
VALVE GEAR
Filed March 8, 1938　　　　4 Sheets-Sheet 1

INVENTOR
Albert Reidinger
BY
Bryant Lowry
ATTORNEYS.

Aug. 6, 1940.  A. REIDINGER  2,210,328
VALVE GEAR
Filed March 8, 1938 4 Sheets-Sheet 3
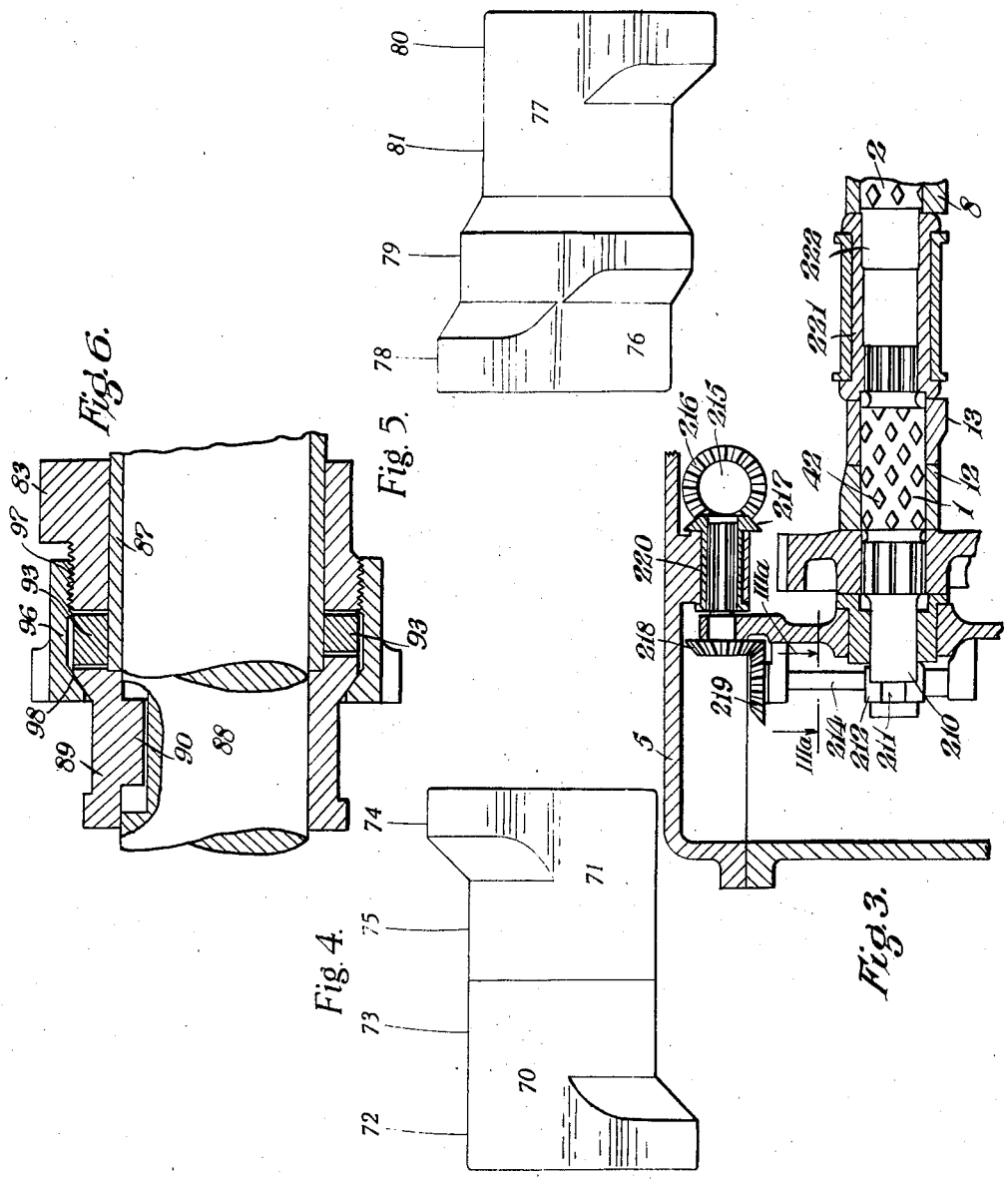

Patented Aug. 6, 1940

2,210,328

UNITED STATES PATENT OFFICE 2,210,328

VALVE GEAR

Albert Reidinger, London, England

Application March 8, 1938, Serial No. 194,674
In Great Britain March 11, 1937

14 Claims. (Cl. 121—127)

This invention relates to valve gears of the cam actuated type for reversible engines driven by steam or other elastic fluids.

It is realised that an infinite selection of valve timings in the periodic cycle of both admission and exhaust ports is desirable to permit of gradual increases or decreases in power as may be required of reversible engines. With reference to the admission, it is known that the range through which the valve should be controlled to give infinite selection in beginning to open the port is smaller than the range through which said valve should be controlled to give infinite selection in actually closing the port. Further, with reference to the exhaust, it is known that the range through which the valve should be controlled to give infinite selection in beginning to open the port is smaller than the range through which said valve should be controlled to give infinite selection in actually closing the port. Now the range through which the opening of the admission valve or "lead" ocurs may of necessity require to be adjusted in relation to the range through which the closure of the exhaust valve or "compression" occurs while the range through which the opening of the exhaust valve or "release" occurs may of necessity require to be adjusted in relation to the range through which the closure of the admission valve or "cut-off" occurs and the closure of the exhaust valve or "compression."

As far as I am aware, valve gears which have previously been proposed, have in some cases provided infinite selection of valve timings for both directions of rotation within certain fixed ranges, and in other cases the valve timings have been controlled in such a manner as to give certain determined fixed timings. But with such gears it has only been possible to provide a fixed combination of valve timings on a predetermined basis, with the result that either the "lead," "release," or "compression" may have been unsuitable for the "cut-offs" employed, or they may have all been at fault to a lesser or greater amount according to one or other type of engine or the particular conditions in which the engine is required to be worked.

It is realised that with the known types of link operated valve gears, modifications in the valve timings can be made, but only within narrow limits, and in such a manner that an alteration in timing the opening of a valve also alters the timing of closing the same valve. Further, with reference to cam actuated valve gears, it is realised that modifications in the valve timings can be made but these also can only be altered within narrow limits, and then only by the substitution of the controlling members for others of different form of construction. If therefore all the events could be correctly adjusted in relation to each other, and having been so adjusted as to be infinitely selective throughout their particular set ranges, then the maximum efficiency and power would be obtained.

It is an object of the invention to provide, in cam-actuated valve-gearing, means whereby either of the events controlled by a valve, for example "lead" and "cut-off," may be varied independently of the other event controlled by that valve.

It is thus an object of the invention to provide, in cam-actuated valve gear of the differential type, means whereby either of two cams, which control a single valve by their differential action, may be angularly adjusted in relation to the crank circle of the engine independently of the other cam.

It is a further object of the invention to provide cam-actuated valve gearing whereby any one of the four valve events of an engine (namely "lead" or "pre-admission," "cut-off," "compression" and "release") may be varied independently of the other events. It is therefore an object of the invention to provide means whereby the optimum relation of the basic points forming the cycle of events in a double acting fluid pressure piston engine without having to alter the form of or exchange any of the controlling members.

It is a still further object of the invention to provide cam-actuated valve-gearing of the differential type in which different cams are used for controlling the same event during forward and backward running respectively and means are provided whereby either of the cams controlling a single valve may be angularly adjusted in relation to the crank circle of the engine independently of the other cam, such adjustment of a cam being accompanied by corresponding adjustment of the cam for controlling the same event during running in the other direction.

With the above and other objects in view, the invention consists in the improved combinations and arrangements contained in the embodiments now to be described in detail, and features of which are set out in the claims which follow.

In the drawings:

Fig. 1 is an elevation showing cam gear for controlling the valves of one of the cylinders of a reversible reciprocating steam engine, including the cam-followers provided for the valves at one end of the cylinder, Fig. 2 is a sectional elevation taken through the cams and camshafts of the same gear, Fig. 3 is a sectional elevation through a part of the gear of Figs. 1 and 2 showing a modification, Fig. 3a is a section on the line IIIa—IIIa of Fig. 3.

Figs. 4 and 5 are elevations of modified forms of cams which may be substituted for cams employed in the gear shown in Figs. 1 and 2.

Fig. 6 is a view in sectional elevation illustrating an alternative method of mounting a cam upon its camshafts.

Figure 1:
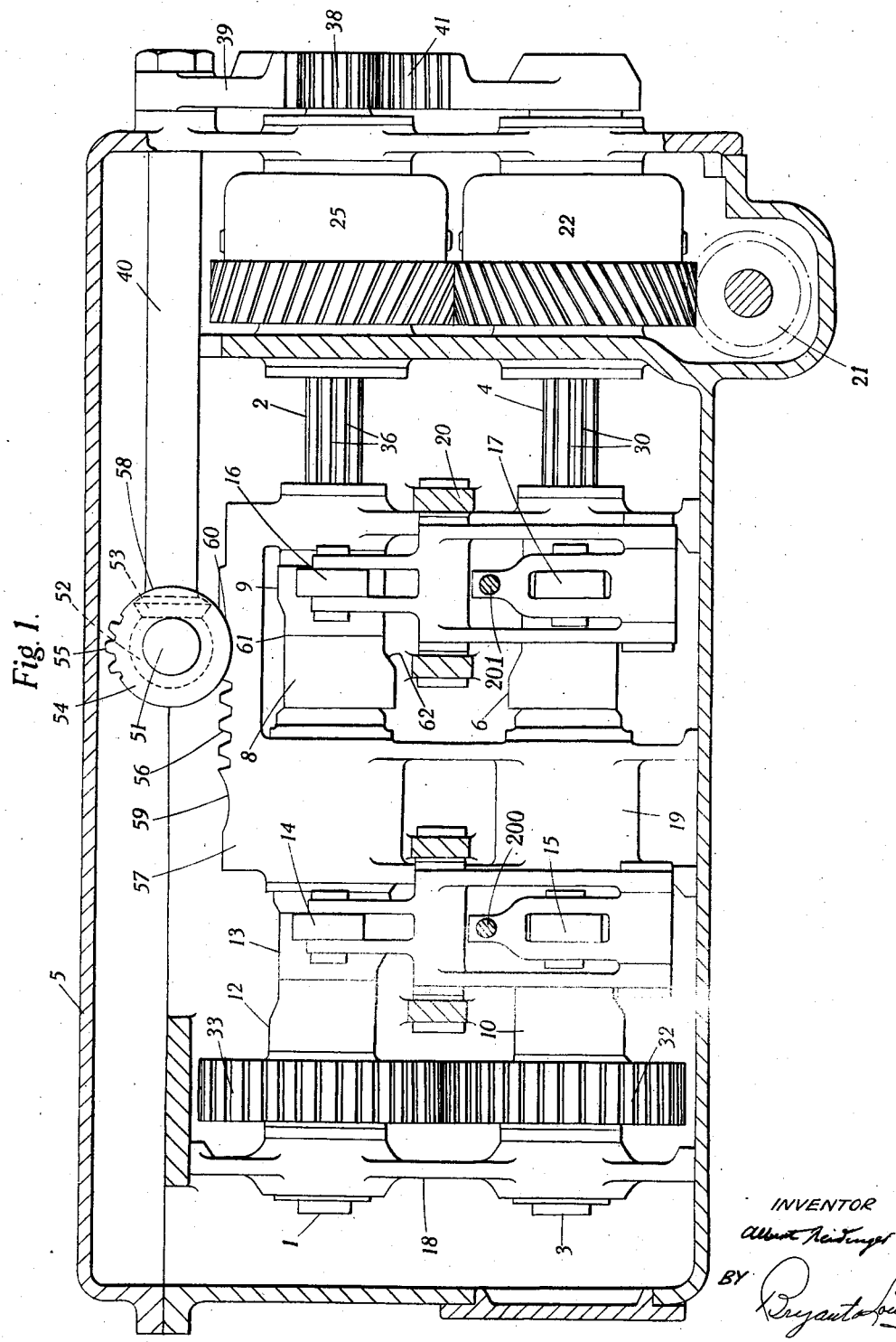
Figure 2:
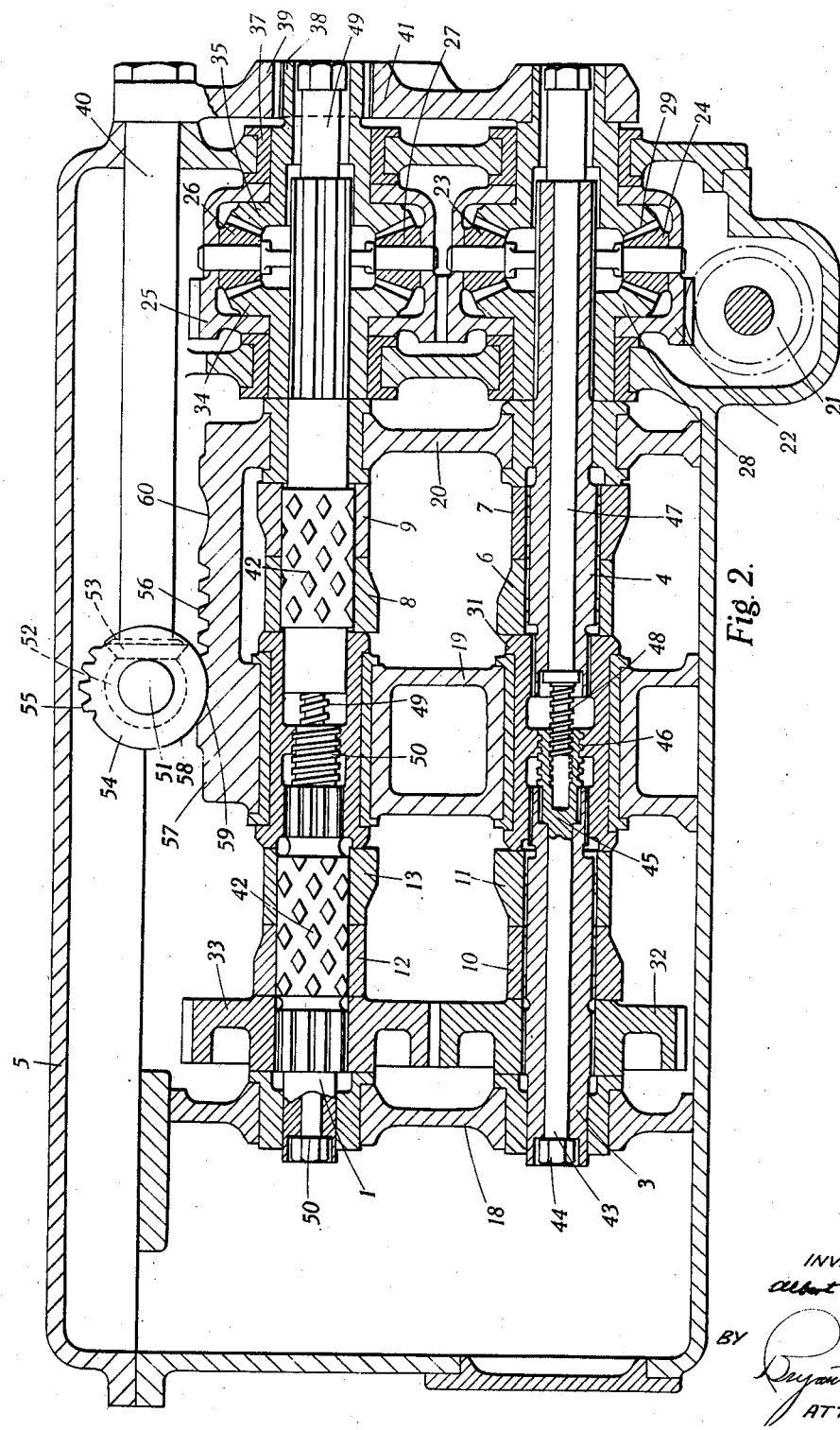
Figure 9:
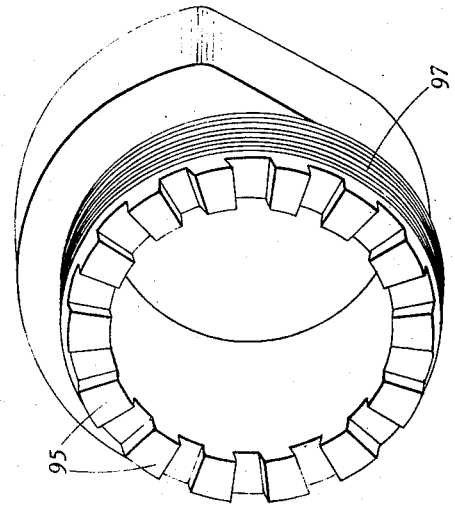
Figs. 7, 8 and 9 are perspective views of parts shown in Fig. 6.
Figure 8:
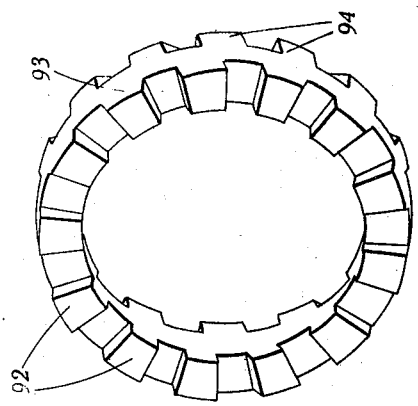
Figure 7:
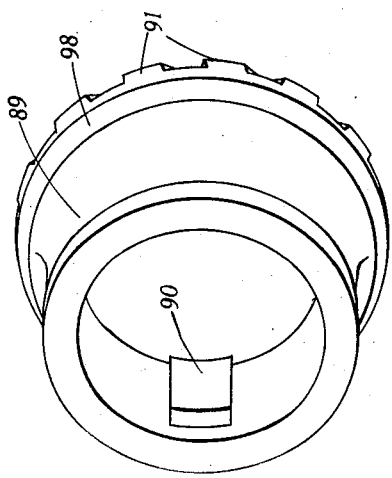

In the form of cam gear shown in Figs. 1 and 2, four hollow camshafts 1, 2, 3 and 4 are arranged in pairs within a casing 5, the upper pair of coaxial shafts 1 and 2 being arranged immediately above the lower pair of coaxial shafts 3 and 4.

The camshafts 1 and 3 carry cams for differentially controlling the exhaust valves (the spindle of one of which is indicated at 200 in Fig. 1) by means of followers, for example as described in United States patent specification No. 2,075,469 whilst the shafts 2 and 4 carry the cams for controlling the admission valves (the spindle of one of the admission valves being indicated at 201 in Fig. 1). The cams carried by the lower shafts control the opening of the respective valves, whilst the cams carried by the upper shafts control their closing.

Separate cams are provided for controlling the various valve events for the two directions of running: thus, the cams 6 and 7 on the shaft 4 control the opening of the admission valves (lead) for forward and backward running respectively, the cams 8 and 9 on the shaft 2 control the closing of the admission valves (cut off) for forward and backward running respectively, the cams 10 and 11 on the shaft 3 control the opening of the exhaust valves (release) for forward and backward running respectively, and the cams 12 and 13 on the shaft 1 control the closing of the exhaust valves (compression) for forward and backward running respectively.

The followers provided for cooperation with the various cams are shown in Fig. 1 at 14, 15, 16 and 17 respectively.

During forward running, the followers 16 and 17 cooperate with the cams 8 and 6 respectively so that the associated admission valve is open during such time that both followers are in contact with the high portions of the cams, and the exhaust valve at the same end of the cylinder is opened by the cooperation of the followers 14 and 15 with the high portions of the cams 12 and 10 respectively.

The camshafts are mounted in a cage including sliding bearing members 18, 19 and 20 so that the cams and camshafts may be moved bodily in an axial direction to bring the cams 13, 11, 9 and 7 into position for cooperation with followers 14, 15, 16 and 17 respectively for backward running.

The camshafts are driven from the engine by means of a spiral gear wheel 21 which meshes with the externally toothed portion of a casing 22. This casing carries the spindles of a pair of bevel pinions 23 and 24 and its external toothed portion meshes with the similar portion of a casing 25 which acts as the carrier of a pair of bevel pinions 26 and 27.

The bevel pinions 23 and 24 both mesh with bevel wheels 28 and 29, of which the former is in driving engagement with one end of the camshaft 4, by means of the longitudinal splines 30 thereon. The other end of the shaft 4 is in splined engagement with a sleeve 31 which is carried by the bearing member 19 and also has splined engagement with one end of the camshaft 2. The other end of this latter shaft has splined upon it a spur wheel 32 which meshes with a spur wheel 33 splined upon the camshaft 1.

The bevel pinions 26 and 27 both mesh with bevel wheels 34 and 35, of which the former has splines engaging the longitudinal splines 36 on the camshaft 3.

If, as viewed in Fig. 2, the worm 21 rotates in a counter-clockwise direction and the gears 29 and 35 are held stationary, the cage 22 will rotate clockwise and the cage 25 will rotate counter-clockwise as viewed from the right end in Figs. 1 and 2. Rotation of the cage 22 in a clockwise direction causes gear 28, shaft 4, sleeve 31, shaft 3 and gear 32 to all rotate in a clockwise direction thus rotating cams 6, 7, 10 and 11 in a clockwise direction. The gear 32 meshes with gear 33 to rotate it and shaft 1, and cams 12 and 13 in a counter-clockwise direction.

The hub portion of the bevel wheel 35 extends through a bearing member 37 and has a spur wheel 38 formed on its outer end. This spur wheel meshes with a toothed sector 39 fast on the end of a shaft 40 and a toothed sector 41 of larger radius which is rigidly secured to the outer end of the hub portion of the bevel wheel 29.

Owing to the arrangement of spur wheel and toothed sectors just described, rotation of the shaft 40 will result in rotation of the bevel wheels 35 and 29 and thus in variation of the angular relationships between the various camshafts and the crank circle of the engine. The sector 41 is made of larger radius than the sector 39 so that the variation of cut-off during notching up may be considerably greater than the variations of lead, compression and release.

Individual adjustment of the various pairs of cams upon their respective shafts, and thus independent adjustment of each of the four valve events, is provided for as follows:

Each camshaft is provided with sets of right and left hand helical splines of equal pitch, as indicated at 42 in the cases of shafts 1 and 2, and the cams for forward running (that is to say, cams 6, 8, 10 and 12) are internally threaded to respond to the splines of one hand, whilst the cams for backward running (cams 7, 9, 11 and 13) are threaded to respond to the splines of the opposite hand. Axial movement of any camshaft relatively to its cams thus causes the two cams to rotate in opposite directions, so that individual variation of any valve event for forward running, by angular adjustment of the appropriate cam upon its shaft, is automatically and simultaneously accompanied by corresponding adjustment of the cam for controlling that same event during backward running.

The axial movement of the camshafts relatively to their cams is effected by screw members which are mounted in the hollow shafts and are arranged for independent actuation by means of a suitable tool.

The angular adjustment of the release cams 10 and 11 upon their shaft 3 is effected by means of a bar 43 which passes through the hollow shaft and has an enlarged head portion 44 at the outer end and an enlarged portion 45 at the other end, which is in threaded engagement with a portion 46 of the sleeve 31. Rotation of the bar 43 thus causes the camshaft 3 to partake of axial movement relatively to the cams and the other members carried by the cage, with the result that the cams 10 and 11 are caused to rotate with relation to the shaft.

The adjustment of the cams 6 and 7 upon their shaft 4 is effected by means of a bar 47 which passes through the camshaft and has a threaded portion 48 at the inner end which engages internal screw threads in the end portion 45 of the bar 43. Similar bars 49 and 50 are provided for the adjustment of the cams 8 and 9 and 12 and 13 respectively.

The long splines provided on the cam shafts ensure that the axial adjustment of the shafts does not affect the drive of the valve gear.

In some cases it may be desired to control each of the four valve events separately from the driver's cab so that, in addition to the control provided by the reversing gear, any event may be varied, during running, independently of the other events. An example of control mechanism for this purpose is illustrated in Figs. 3 and 3a.

The control mechanism illustrated in Figs. 3 and 3a is shown as applied to the camshaft 1 and serves for the angular adjustment of the cams 12 and 13 in relation to that shaft.

As shown, the camshaft, which is not necessarily hollow in this modification, has a projecting portion 210 provided with a circumferential groove 211. This groove is engaged by a fork 212 on the end of an arm 213 carried by a vertical shaft 214.

The shaft 214 is mounted in bearings carried by the member 18 and is arranged to be rotated from the driver's cab by means of a shaft 215 and bevel wheels 216, 217, 218 and 219.

The bevel wheel 217 is formed with a sleeve 220 which is mounted in a bearing carried by the casing 5 and has splined connection with the spindle of the bevel wheel 218.

Rotation of the shaft 215 by means of an appropriate control in the driver's cab causes the arm 213 to swing in one direction or the other and thus causes the camshaft 1 to move axially relatively to the cams 12 and 13 which are simultaneously rotated in opposite directions on the shaft by the splines 42.

The engagement of the groove 211 by the fork 212 permits rotation of the camshaft in the normal drive of the cams, whilst the splined connection between the bevel wheels 217 and 218 permits the axial movement of the cams and camshafts as a whole by the reversing gear.

As shown at the right of Fig. 3, the camshaft 1 has splined connection with the bearing sleeve 221 whilst the camshaft 2 has a plain portion 222 which is slidably borne by the other end of the sleeve.

Mechanism equivalent to that shown at 210 to 219 for the shaft will be provided for each of the other camshafts 2, 3 and 4 so that each pair of forward and backward running cams may be individually adjusted from the driver's cab by appropriate rotation of the corresponding shaft 215.

The reversing gear comprises a shaft 51, which can be rotated from the driver's cab, and drives the shaft 40 by means of bevel wheels 52 and 53. A wheel 54 is also fixed on the shaft 51 and has teeth 55 for cooperation with rack teeth 56 on a member 57 forming part of the cage.

The wheel 54 has a portion 58 which has no teeth and engages an arcuate depression 59 in the member 57 during forward drive and a similar depression 60 during backward drive. Reduction gearing, not illustrated, is included in the reversing gear at some convenient points between the wheel 54 and the sector 39.

In Fig. 2 the parts are shown in the condition known as "full forward gear". If the shaft 51 be rotated in the clockwise direction, as seen in the figure, the valve events are varied through their range for forward drive until the condition of "early cut-off", is reached when the shaft has rotated through approximately 110° from the position shown in Fig. 2. Upon continued clockwise rotation of the shaft, the teeth 55 engage the rack teeth 56 with the result that the cage, with the cams and camshafts and spur wheels 32 and 33, is shifted bodily to the left. When the toothless portion 58 of the wheel just begins to engage the depression 60, the cage has moved to the left into the position in which the cam followers 14, 15, 16 and 17 engage the cams 13, 11, 9 and 7 respectively and the cams occupy the correct positions, relatively to the crank circle, for "early cut-off, backward gear."

Continued rotation of the shaft 51 in the clockwise direction causes no further axial movement of the camshafts and other members carried by the cage and results only in the angular adjustment of the cams and camshafts to give the full range of valve-event control up to the condition of "full backward gear", which condition is illustrated by Fig. 1.

As shown in the drawings, the adjacent portions 61 of the pairs of cams are formed with circular profiles concentric with the camshafts and these profiles are joined to the high portions of the cam profiles by inclined surfaces 62. In an intermediate position of the reversing gear, the cam-followers contact these profiles 61 with the result that all the valves are permitted to remain closed, providing a neutral condition.

Figs. 4 and 5 show sets of cams, for inlet and exhaust valve-control respectively, which may be substituted for those shown in Figs. 1 and 2 if it is desired to provide a further one of the intermediate conditions mentioned above, namely a by-pass condition in which the exhaust valves remain open and the admission valves are permitted to close.

In Fig. 4, a pair of cams 70 and 71 having cam surfaces 72 and 73 and 74 and 75 respectively are shown. The surfaces 72 and 74 are the working surfaces for the normal operation of the admission valves during forward and backward running respectively. The surface 75 is of such radius as to allow the admission valves to remain closed in the neutral condition and the surface 73 is a similar surface designed to allow the admission valves to remain closed when the by-pass condition is desired.

The exhaust cams 76 and 77 shown in Fig. 5 have surfaces 78 and 79 and 80 and 81 respectively, of which 78 and 80 are the working surfaces for normal operation of the exhaust valves during forward and backward running respectively. The surface 81 of the cam 77 allows the exhaust valves to close when the neutral condition is to obtain and the surface 79 of the cam 76 maintains the exhaust valves open to provide the by-pass condition.

The cam followers shown in Fig. 1 are those provided for the operation of the valves at one end of the cylinder; similar followers for the operation of the valves at the other end of the cylinder are provided on the other side of the gear for cooperation with the same cams.

Figures 6, 7 and 8 and 9 illustrate a method alternative to that employed in the arrangement shown in Figures 1 and 2, whereby cams may be arranged for independent angular adjustment upon their camshafts.

According to this alternative method each cam is loosely mounted upon a sleeve 87, which are in turn loosely mounted upon the camshaft 88; driving engagement between each cam and the camshaft is maintained by means of a member 89 which has a diamond-shaped dog 90 engaging a groove in the surface of the camshaft and teeth 91 (Fig. 7) which engage teeth 92 (Fig. 8) in the adjacent face of a ring 93. The ring 93 is loosely mounted on the sleeve 87 and has teeth 94 on the other face which engage teeth 95 (Fig. 9) on the adjacent face of the cam 83. The parts are locked with the respective teeth in engagement by means of a sleeve 96 which has a threaded portion engaging screw threads 97 on the cam and an inclined shoulder 98 engaging a corresponding surface of the member 89.

Angular adjustment of each cam upon the camshaft independently of the reversing gear and independently of the adjustment of any other cam, may be effected by unscrewing the associated sleeve member and sliding the ring 93 to free the cam which may then be rotated upon the camshaft as required. Different numbers of teeth are formed on the opposite faces of the ring so that each cam may be positively locked in any one of a large number of closely spaced angular positions in relation to the camshaft.

The above specific forms of valve gearing have been described by way of example and it will be understood that the invention is not limited to such specific forms and that various modifications can be made in the particular devices employed without departing from the invention.

I claim:

1. A cam-actuated valve gear for an elastic fluid-driven engine, comprising in combination with an engine cylinder and a piston reciprocable in said cylinder, a valve, a pair of cams arranged for differential operation upon said valve, a reversing gear adapted to vary the events of said valve in relation to the travel of said piston in said cylinder, and means other than said reversing gear for varying the event controlled by either of said cams independently of the event controlled by the other of said cams.

2. A cam-actuated valve gear for an elastic fluid-driven engine, comprising in combination with an engine cylinder and a piston reciprocable in said cylinder, an inlet valve, and an exhaust valve, means for controlling one of said valves, a pair of cams arranged to control the other of said valves by their differential action, and means for angularly adjusting either cam in relation to the travel of said piston in said cylinder independently of the other cam and independently of said controlling means.

3. A cam-actuated valve gear for an elastic fluid-driven engine, comprising in combination with an engine cylinder and a piston reciprocable in said cylinder, a valve, a pair of cams arranged to control said valve by their differential action, at least one camshaft carrying said cams, a reversing gear operable upon said camshaft to vary the controlling effect on said valve, and means for adjusting each of said cams on its shaft independently of the other cam to vary its controlling effect upon said valve and independently of the reversing gear.

4. A cam-actuated valve gear for an elastic fluid-driven engine, comprising a pair of cams for controlling the admission events of a cylinder of the engine, namely lead and cut-off respectively, and a pair of cams for controlling the exhaust events, namely release and compression respectively, the arrangement being such that three of the cams are capable of independent angular adjustment relatively to the angular relation of the fourth cam to the travel of the piston in the cylinder.

5. A cam-actuated valve gear for an elastic fluid-driven engine, comprising a pair of cams for controlling the admission events of a cylinder of the engine, namely lead and cut-off respectively, and a pair of cams for controlling the exhaust events, namely release and compression respectively, and means adapted to be actuated from the driver's cab for the independent angular adjustment of three of said cams, relatively to the angular relation of the fourth cam to the travel of the piston in the cylinder.

6. A cam-actuated valve gear for an elastic fluid-driven engine, comprising separate cams for each of the four valve events of a cylinder of the engine, namely lead, cut-off, compression and release, and reversing gear for varying the valve events in relation to the travel of the piston in the cylinder, the cam provided for each event being arranged for angular adjustment in relation to the travel of the piston in the cylinder independently of the reversing gear.

7. A cam-actuated valve gear as specified in claim 1, in which variation of a valve event for one direction of drive in relation to the travel of the associated piston by means other than reversing gear provided for the control of the engine is automatically accompanied by corresponding variation of the same event for drive in the opposite direction.

8. In a cam-actuated valve gear as specified in claim 1, at least one camshaft carrying said cams being rotatable by said reversing gear to vary the valve events relatively to the travel of the associated piston and means whereby either of the pair of cams arranged to act differentially upon the same valve may be angularly adjusted upon its camshaft independently of the other cam.

9. A cam-actuated valve gear as specified in claim 1, comprising at least one camshaft carrying said cams being rotatable by said reversing gear to vary the valve events relatively to the travel of the associated piston and means whereby either of the pair of cams arranged to act differentially upon the same valve may be angularly adjusted upon its camshaft independently of the other cam and independently of the reversing gear, by means of relative axial movement between the cam and the shaft.

10. In a cam-actuated valve gear as specified in claim 1, a camshaft, means for axially displacing said shaft, two cams on said camshaft each for controlling the same event in opposite direction of drive, helical cam splines of opposite hand formed on said camshaft to rotate said cams in opposite directions relatively to the camshaft during the axial displacement of said camshaft.

11. In a cam-actuated valve gear as specified in claim 1, a camshaft, means for axially displacing said shaft, operable from the driver's cab and independently of the reversing gear, two cams on said camshaft each for controlling the same event in opposite direction of drive, helical cam splines of opposite hand formed on said camshaft to rotate said cams in opposite directions relatively to the camshaft during the axial displacement of said camshaft.

12. A cam-actuated valve gear as specified in claim 1, comprising a shaft, a cam on said shaft, teeth fixed in relation to the cam and camshaft, and a member having sets of teeth of unequal number adapted to engage said fixed teeth to lock said cam relatively to said camshaft.

13. A cam-actuated gear for controlling a valve in an elastic fluid-driven engine comprising a pair of camshafts each carrying a pair of cams, mounted on right and left hand splines respectively, whereby axial movement of the camshaft relatively to the cams results in simultaneous and opposite rotation of the cams relatively to their camshaft, the cams on one shaft being arranged to control the opening of the valve during forward and backward running respectively and those on the other shaft being arranged to control the closing of the valve during forward and backward running respectively.

14. A cam-actuated gear for controlling a valve in an elastic fluid-driven engine comprising a pair of camshafts each carrying a pair of cams, mounted on right and left hand splines respectively, whereby axial movement of the camshaft relatively to the cams results in simultaneous and opposite rotation of the cams relatively to their camshaft, the cams on one shaft being arranged to control the opening of the valve during forward and backward running respectively and those on the other shaft being arranged to control the closing of the valve during forward and backward running respectively, reversing gear being provided whereby the driver may control the camshafts from his cab to cause them to rotate relatively to the stroke of the associated piston to vary the timing of the events controlled by the cams and further controlling means operable from the driver's cab, for shifting either camshaft axially relatively to its cams.

ALBERT REIDINGER.